May 6, 1952     J. B. PETERSON     2,595,881
COMPENSATED THERMOMETER
Filed Sept. 25, 1946

Inventor
JOHN B. PETERSON
By Strauch + Hoffman
Attorneys

Patented May 6, 1952

2,595,881

UNITED STATES PATENT OFFICE 2,595,881

COMPENSATED THERMOMETER

John B. Peterson, Bethesda, Md.; Ruth L. Peterson administratrix of said John B. Peterson, deceased Application September 25, 1946, Serial No. 699,273

2 Claims. (Cl. 73—34.5)

This invention relates to electric resistance thermometers for measuring the temperature of the air in which an airplane is flying or the temperature of any gas which is flowing at high velocity as in a tunnel or pipe line.

An accurately calibrated thermometer, when used on aircraft to measure the temperature of the air in which the aircraft is flying will indicate a higher temperature than the true temperature of the air because of adiabatic compression of the air at the thermometer. Theoretical calculations indicate that the positive error may be as high as 25 centigrade degrees for a true air speed of 500 miles per hour, and that the error varies as the square of the true air speed. These calculations have been checked by actual tests.

It is a primary object of this invention to provide a compensated electric resistance thermometer for use on aircraft, which will indicate the true temperature of the air at any air speed.

It is a further object to provide an electric resistance thermometer for indication of the true temperature of a gas flowing at high velocity in a pipe line, intake manifold or exhaust stack.

These and other objects are effected by my invention, as will be apparent from the following description and claims, taken in connection with the accompanying drawings, in which:

Figure 2:
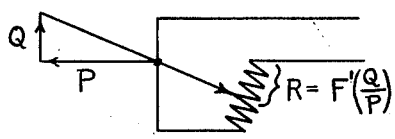
Figure 2 is a schematic diagram the purpose of which is to explain more clearly the mechanism of the compensator.

Before the figures are taken up in detail certain relations between the true temperature, the apparent temperature and the air speed will be discussed mathematically. The following terminology will be used:

$T$ = the true temperature, degrees centigrade absolute.
$U$ = the apparent temperature, degrees centigrade absolute.
$V$ = the velocity.
$H$ = a constant, depending on the thermometer and on the units in which $V$ is expressed.
$P$ = the static pressure.
$P_T$ = the Pitot pressure.

$Q$ = the Pitot-static differential pressure $P_T - P$.
$M$ = the Mach number.
$C$ = a constant, depending on thermometer.
$a, b, t, u$ = the resistance of bridge arms as shown on the drawings.
$g, h$ = constants.

The relation between the true temperature $T$, and the apparent temperature, $U$, is:

$$U = T + HV^2 \qquad (1)$$

If $V$ is expressed in miles per hour the constant $H$, according to tests on actual thermometers will be between $0.6 \times 10^{-4}$ and $1.0 \times 10^{-4}$. The larger figure is the theoretical full adiabatic rise. Thermometers with lower values for the constant $H$ have the disadvantage that the value of the constant will vary with the location of the thermometer on the airplane. For this reason, thermometers with the full rise are preferred. Thermometers with the full rise are known as stagnation point thermometers.

The true air speed of an airplane is given by the following equation:

$$V = K \sqrt{\left[\left(1 + \frac{Q}{P}\right)^{2/7} - 1\right] T} \qquad (2)$$

$$V^2 = K \left[\left(1 + \frac{Q}{P}\right)^{2/7} - 1\right] T \qquad (3)$$

(In the equations set forth in this specification, $K$ may have a different value for each equation.) Since $$M^2 = 5\left[\left(1 + \frac{Q}{P}\right)^{2/7} - 1\right] \qquad (4)$$

$$V^2 = KM^2 T \qquad (5)$$

Substituting this value for $V^2$ in Equation 1, $$U = T + CM^2 T = T(1 + CM^2) \qquad (6)$$

and $$T = \frac{U}{1 + CM^2} = \frac{U}{1 + F'\left(\frac{Q}{P}\right)} \qquad (7)$$

In Equation 7, $$F'\left(\frac{Q}{P}\right)$$

(a function of the ratio $Q/P$), has been substituted for $CM^2$. This is permissible because there are no variables other than the ratio $Q/P$ in the right hand side of Equation 4, expressing the value of $M^2$, and $C$ is a constant.

Equation 7 may be expressed as a series.

$$T = U[1 - CM^2 + (CM^2)^2 - (CM^2)^3 \ldots] \quad (8)$$

and $$T = U\left[1 - F''\left(\frac{Q}{P}\right)\right] \quad (9)$$

The $F''$ of Equation 9 is slightly different from the $F'$ of Equation 7, because of the introduction of the smaller terms of the series of Equation 8. According to Equation 7, $$F'\left(\frac{Q}{P}\right) = CM^2$$

and according to Equations 8 and 9

$$F''\left(\frac{Q}{P}\right) = CM^2 - (CM^2)^2 + (CM^2)^3 \ldots$$

The value of the constant C is dependent on the thermometer element. For the full adiabatic rise, C is equal to approximately 0.16.

The adiabatic rise compensators described in this specification are based on either Equation 7 or Equation 9. Although the $F'$ of Equation 7 is slightly different from the $F''$ of Equation 9, either function can be mechanized by the apparatus shown in Figure 1. This compensator is enclosed in an air-tight compartment 11. The pressure in this compartment is maintained at the static pressure by a connection at tube 12 to a static pressure source. Bellows 16, which is subjected internally to the Pitot pressure $P_T$ by means of connection 14, operates strut 17 and a dog-leg lever 18 through diaphragm seal 20. Tension spring 22 forces lever 18 to maintain contact with strut 17. Bellows 23, which is evacuated, and being inside compartment 11 is subjected to static pressure, operates, through flexure strip 24, to shift strut 17, so that the length of lever 18 from flexure diaphragm 20 to the point of contact with strut 17 is proportional to the static pressure P. The combined action of bellows 16 and 23 operates the contactor 25a on rheostat 25. Rheostat 25 is shaped so that its resistance between leads 28 and 29 will be proportional to $F'(Q/P)$ of Equation 7 or the $F''(Q/P)$ of Equation 9, as desired.

Figure 1:
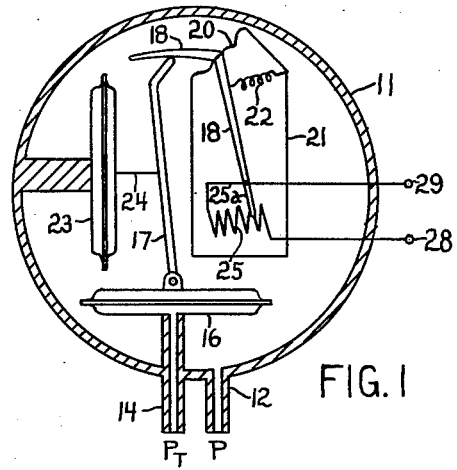
Figure 1 shows the arrangement of a compensator unit.

Figure 2 is a schematic diagram of the compensator of Figure 1, which shows clearly how the resistance is a function of the ratio of $Q/P$. It is easily visualized that the values of Q and P could both be multiplied by any number without changing the shape of the QP triangle and without changing the position of the contactor on the rheostat.

Figure 3:
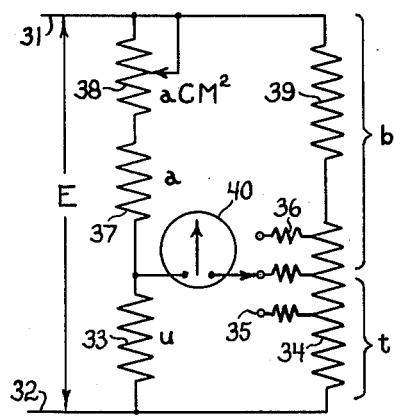
Figure 3 shows a compensated thermometer using a D'Arsonval instrument as an indicator.

Figure 3 shows a multi-range thermometer which is compensated for adiabatic rise in accordance with the equation $$T = \frac{U}{1 + CM^2}$$

A continuous voltage supply, connected to the instrument at 31—32, supplies power to the Wheatstone bridge. A temperature sensitive resistance element 33, has a resistance $u = gU$. Resistor 34 has a resistance $t = hT$. Here T is the indication of the instrument which for a theoretically perfect instrument is identical with the true temperature T. Bridge arm 34 is fitted with range taps 35. Each tap has a resistor 36 which sets the total galvanometer resistance so that its deflection sensitivity has the desired value for each tap. The resistance of the third arm, 37 plus 38, is equal to $a(1+CM^2)$. This arm is composed of fixed resistor 37 and a compensator 38 of the type described in Figure 1. The fourth arm is composed of fixed resistor 39 plus part of tapped resistor 34. The total resistance of this arm is equal to b. When the bridge is balanced, $$t = \frac{bu}{a(1 + CM^2)}$$

or $$hT = \frac{b}{a} \cdot \frac{gU}{(1 + CM^2)}$$

By the proper selection of values for the constants, so that $a/b = g/h$, this equation can be made identical with Equation 7.

The scale of indicator 40 may have any of several different arrangements. For instance the scale may be marked 0 to 10 and the circuits so arranged that the true temperature is equal to the tap setting plus the indicator reading. Taps might be marked —50, —40, . . . to . . . +40, +50° C.

Figure 4:
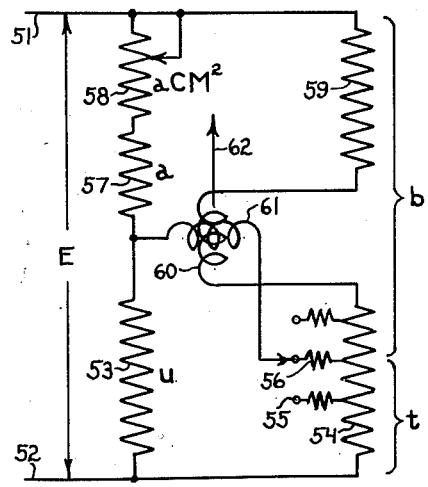
Figure 4 shows a compensated thermometer using a ratio type instrument as an indicator.

Figure 4 shows an instrument which is identical with the instrument shown in Figure 3 except that a ratio indicator has been substituted for the D'Arsonval indicator. The indications of the instrument shown in Figure 3 are independent of variations in voltage of the supply at the balance point only. Indicator deflections vary directly as the voltage of the supply. The instrument shown in Figure 4 is independent of voltage variations at the balance point and this instrument has the additional advantage that deflections of the ratio indicator are also independent of variations in voltage of the supply. To accomplish this, coil 60 carries a current which varies directly as the voltage E of the supply and is not affected by any other factors. Null coil 61 carries a current the magnitude and direction of which is determined by the condition of balance of the bridge. The deflection of pointer 62 is a function of the ratio of current in coil 61 to the current in coil 60. Since both currents are affected directly by voltage variations, the ratio of the currents and the indication of the indicator are unaffected.

Figure 5:
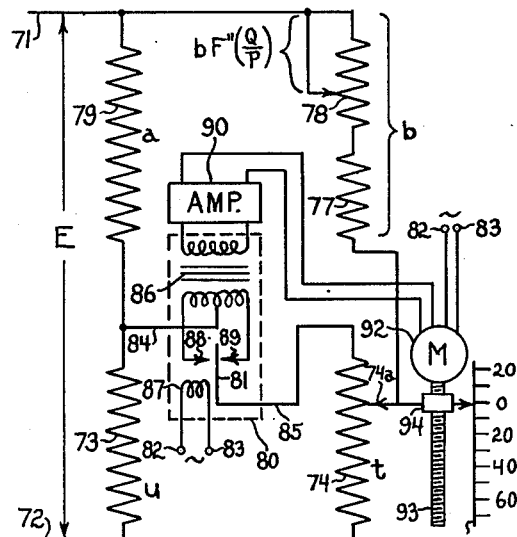
Figure 5 shows a self-balancing thermometer bridge provided with compensation for adiabatic temperature rise.

Figure 5 shows a self-balancing bridge circuit which is useful in the construction of recording instruments. The four arms are (1) temperature sensitive resistance element 73, the resistance $u$ of which is equal to $gU$; (2) rheostat 74 with motor driven contactor 74a, the effective resistance $t$ of which is equal to $hT$; (3) compensator arm 77—78 wherein 77 is a fixed resistance and 78 is a compensator of the type described in Figure 1, the effective resistance of the arm being $$b\left[1 - F''\left(\frac{Q}{P}\right)\right]$$

as indicated on the drawing; and (4) fixed resistance 79 of resistance $a$. When balanced, $$t = \frac{b}{a} \cdot u\left[1 - F''\left(\frac{Q}{P}\right)\right]$$

or $$hT = \frac{b}{a} \cdot gU\left[1 - F''\left(\frac{Q}{P}\right)\right]$$

By the proper selection of values for the constants so that $a/b = g/h$ this equation can be made identical with Equation 9. The temperature is indicated or recorded on a scale 75 alongside rheostat 74, or any type of indicator such as a multi revolution round dial indicator may be used by gearing the pointer shaft to motor 92.

A voltage detector which is sensitive to a small continuous voltage and still rugged enough to use on aircraft is indicated at 80. The main component of the voltage detector is a vibrator 81 which serves to change a small continuous voltage to an interrupted or alternating voltage so that it can be amplified by an electronic amplifier. A source of alternating current 82—83 is required to operate the vibrator. The voltage detector operates to bring the voltage between lines 84 and 85 to zero. Line 84 is connected to the center tap of the primary of transformer 86 and line 85 is connected to vibrator 81 which is vibrated by alternating current electromagnet 87 to make contact alternately with two contacts 88 and 89 which are connected to the primary of transformer 86. If any potential difference exists between lines 84 and 85, an alternating voltage will be developed in the secondary of transformer 86. This is amplified by amplifier 90 and fed into one phase of two-phase induction motor 92. The other phase of this motor is constantly excited from the same alternating current source 82—83 which supplies electromagnet 87. This makes motor 92 reversible, the direction of rotation depending on the relative polarity of lines 84 and 85.

Motor 92 rotates worm shaft 93 on which is threaded a nut 94 carrying the contactor 74a which moves along rheostat 74 seeking the balance point.

The compensators of the instruments described in this specification each has a delicate contactor operating on a fine wire rheostat. Such arrangements have given trouble in the past but there are three factors which make their use permissible in my instrument and which provide much improved performance.

First, the vibration which is always present in aircraft makes it possible to operate with slightly more contact pressure than would otherwise be permissible.

Second, the delicate rheostats and their contactors are adaptable to hermetic sealing in an inert gas as within compartment 21 of Figure 1. In order to make hermetic sealing possible, lever 18 is introduced between pressure bellows 16 and 23 and the contactor on rheostat 24. As shown in Figure 1, lever 18 is pivoted through the wall of hermetically sealed compartment 21 by means of diaphragm seal 20. The use of a lever between the bellows and the rheostat contactor is also necessary in order to make it possible to balance the parts against acceleration and vibration, and is desirable because of the magnification of the bellows motion which may be obtained.

Third, an error of 4% in the compensator would result in an error of only one centigrade degree at a true air speed of 500 M. P. H. and much less at lower air speeds.

The invention may be embodied in other specific forms without departing from the spirit or essential characteristics thereof. The present embodiments are therefore to be considered in all respects as illustrative and not restrictive; the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In an electric resistance thermometer operable to indicate the true temperature of a gas moving relatively thereto at any speed, a source of electric current; a Wheatstone bridge circuit connected to said source including a first branch and a second branch in series; said first branch including a temperature sensitive resistance element the resistance of which varies with the temperature; said second branch including a rheostat; a static pressure responsive element; a Pitot-static differential pressure responsive element interconnected with said static pressure responsive element and the contactor of said rheostat to control the resistance of said rheostat in accordance with the static pressure and the Pitot-static pressure of the relatively moving gas; variable resistance means in another branch of said bridge circuit; means connected in said bridge circuit between said variable resistance and the juncture of said first and second branch to indicate a state of unbalance in the bridge circuit; and true temperature indicating means cooperating with at least one of said two last mentioned means.

2. In an electric resistance thermometer operable to indicate the true temperature of a gas moving relatively thereto at any speed, a source of electric current; a Wheatstone bridge circuit connected to said source including a first branch and a second branch in series; said first branch including a temperature sensitive resistance element the resistance of which varies with the temperature; said second branch including a rheostat; a static pressure responsive element; a Pitot-static differential pressure responsive element interconnected with said static pressure responsive element and the contactor of said rheostat to control the resistance of said rheostat as a function of the ratio of the Pitot-static differential pressure to the static pressure of the relatively moving gas; variable resistance means in another branch of said bridge circuit; means connected in said bridge circuit between said variable resistance and the juncture of said first and second branch to indicate a state of unbalance in the bridge circuit; and true temperature indicating means cooperating with at least one of said last mentioned means.

JOHN B. PETERSON.

REFERENCES CITED

The following references are of record in the file of this patent:

UNITED STATES PATENTS

| Number | Name | Date |
|---|---|---|
| 2,069,509 | Stickney | Feb. 2, 1937 |
| 2,166,104 | Collbohm | July 18, 1939 |
| 2,251,751 | Minter | Aug. 5, 1941 |
| 2,269,068 | Corbin | Jan. 6, 1942 |
| 2,302,713 | Paulin | Nov. 27, 1942 |
| 2,318,153 | Gibson | May 4, 1943 |
| 2,423,609 | Middleton et al. | July 8, 1947 |
| 2,424,511 | Stanley et al. | July 22, 1947 |
| 2,542,717 | Smith | Feb. 20, 1951 |

FOREIGN PATENTS

| Number | Country | Date |
|---|---|---|
| 600,620 | Great Britain | Apr. 14, 1948 |